United States Patent [19]

Mukai Yuuichi et al.

[11] Patent Number: 5,095,789
[45] Date of Patent: Mar. 17, 1992

[54] MULTI SPINDLE AUTOMATIC LATHE

[75] Inventors: Yuuichi Mukai; Takayuki Nagato; Hironari Okitomo; Yoshitoshi Itoh, all of Hiroshima, Japan

[73] Assignee: Mitsubishi Jukogyo Kabushiki Kaisha, Tokyo, Japan

[21] Appl. No.: 602,244
[22] PCT Filed: Sep. 5, 1990
[86] PCT No.: PCT/JP89/00912
  § 371 Date: Dec. 19, 1990
  § 102(e) Date: Dec. 19, 1990
[87] PCT Pub. No.: WO91/03343
  PCT Pub. Date: Mar. 21, 1991

[30] Foreign Application Priority Data

Mar. 8, 1988 [JP] Japan .................. 63-29864[U]

[51] Int. Cl.⁵ .................................................. B23B 9/04
[52] U.S. Cl. ........................................ 83/129; 29/37 R; 82/127
[58] Field of Search ............... 82/129, 126, 127; 29/37 R, 38 B; 409/158, 161

[56] References Cited

U.S. PATENT DOCUMENTS 4,185,366 1/1980 Gilbert ............................ 29/38 B X
4,640,158 2/1987 Link et al. ............................ 82/129

Primary Examiner—Z. R. Bilinsky
Attorney, Agent, or Firm—McGlew & Tuttle

[57] ABSTRACT

A multi spindle automatic lathe comprising a single motor (20) for rotating a plurality of spindles (55) which are freely rotatably supported on a spindle carrier (52) which is in turn supported on a headstock (51) for an indexing rotation so as to prevent a mutual spatial interference occuring between said motor (20) and an elongated member (W) during the processing of such elongated member (W), wherein said spindle carrier (52) has its rotary shaft arranged so as to be a common axis with the output shaft (21) of said motor (20), and wherein the lathe further comprises a means (56), (57) for transmitting the rotary output power of said motor (20) to each of said plurality of spindles, and through-holes (37) defined in the stator portion (29) of said motor (20) so as to be on a common axis with central holes of said plurality of spindles (55).

2 Claims, 3 Drawing Sheets

MULTI SPINDLE AUTOMATIC LATHE

TECHNICAL FIELD

The present invention relates to a multi-spindle automatic lathe, wherein a spindle carrier having a plurality of spindles freely movably provided therewith rotate for an indexing operation so that workpieces held by respective spindles are subject to a plurality of processing operations successively.

BACKGROUND ART

FIG. 5 illustrates a conventional type multi-spindle automatic lathe. In this multi-spindle automatic lathe of prior art, a spindle carrier 9 is freely rotatably provided for an indexing operation. The spindle carrier 9 is freely rotatably provided with spindles 12 evenly spaced each other on a common circle around its rotary axis. A workpiece W is held by means of chuck on each of spindles 12 so as to be processed by a tool 14. A spindle 12 in this multi-spindle automatic lathe is rotated by means of motor 1, as typically illustrated in FIG. 4. The rotary output power of the motor 1 is transmitted from an shaft 5 via a belt 7 and a drive transmitting means to a drive shaft 10. Since a gear provided at one end of the drive shaft 10 engages with a gear 13 provided at each of spindles 12, the rotary movement of the drive shaft 10 is transmitted to each of spindles 12.

A typical motor for the motor 1 is illustrated in FIG. 4.

The motor 1 is designed such that a stator 3 with a coil 2 wound therearound is arranged a case 4 so that its output shaft 5 may be pivotably supported on the case 4 in a central space defined by the stator 3, and a rotor 6 is secured around the outer periphery of the output shaft 5 so as to keep a constant distance from the inner surface of the stator 3. This configuration makes it possible to energize the coil 2 and utilize electromagnetic forces, generated under Fleming's left-hand rule as rotary force to rotate the output shaft 5.

In the above described type multi-spindle automatic lathe, long workpieces W are inserted into the hollow sections of the spindles 12, and are fed progressively. And the unprocessed portion of workpieces W extends outwardly from the spindle carrier 9. Since this configuration causes a spatial interference between the motor 1 and workpieces W, the output shaft 5 of the motor 1 cannot be connected directly with the drive shaft 10 of the spindle carrier 9. Thus the motor 1 is spaced a distance apart, from the spindle carrier 9 and a belt 7, a drive transmitting means 8 and the like are used to connect them each other.

As a result, a multi-spindle automatic lathe utilizing the conventional motor 1 has a complicated structure and large dimensions, which brings forth a problem that a large space for installation is required.

The present invention solves such afore-described problems, and thus it is a major object of the present invention to provide a multi-spindle automatic lathe with a simplified and compact construction.

DISCLOSURE OF THE INVENTION

In order to achieve the afore-mentioned object, a multi-spindle automatic lathe is proposed according to the present invention, wherein a spindle carrier and a rotary output shaft of a motor have a common axis, and the output power of the motor is transmitted to one of the spindles, whereas a plurality of through-holes are made in the stator of the motor, their axes are common with that of the central holes dedfined for each spindle, in order that a long workpiece inserted into one of the central holes of the spindles can be further insertable into one of the through-holes of the stator. Thus, any spatial interference between a long workpiece and the motor can be avoided, and it becomes possible to get closer the spindle carrier and the workpiece.

BEST MODE FOR CARRING OUT THE INVENTION

Figure 1:
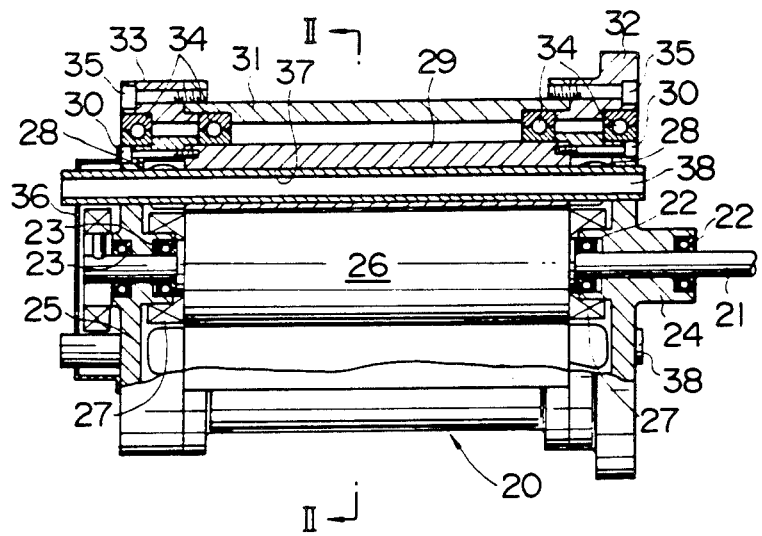
FIG. 1 is a longitudinal cross-sectional view along the line I—I in FIG. 2, illustrating a motor in accordance with one embodiment of the present invention.
Figure 2:
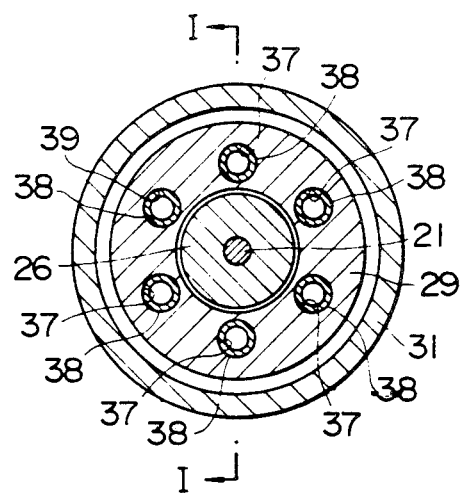
FIG. 2 is a cross-sectional view along the line II—II in FIG. 1.

As illustrated in FIG. 1 and FIG. 2, the ends of a spindle 21 of a motor 20 of the present invention are freely and rotatably supported on end plates 24 and 25 via bearings 22 and 23, and a rotor 26 with a coil 27 wound therearound is secured to the intermediate portion of the spindle 21.

A stator 29 with a coil 28 wound therearound is arranged around the outer periphery of the rotor 26, and its ends are secured to the end plates 24 and 25 by means of bolts 30. A certain distance is maintained between the outer periphery of the rotor 26 and the inner periphery of the stator 29.

When the coils 27 and 28 are energized, the magnetic forces generated rotate the rotor 26 relative to the stator 29, and the spindle 21. The construction of the aforedescribed part of the motor is the same as that of the motor of prior art, and therefore detailed explanation on this part will be omitted.

An outer cylinder 31 and frame bodies 32 and 33, secured to its ends by means of bolt 35, are arranged around the outer peripheres of end plates 24 and 25, and the stator 29. The end plates 24 and 25, and the stator 29 are hold on these outer cylinder 31 and frame bodies 32 and 33 via bearings 34 for free rotation about said spindle 21.

One end of the spindle 21 extends outwardly from the end plate 24 for use as a driving source, and the opposite end is covered by a cover 36 attached to the end plate 25.

A plurality (six in this embodiment) of through-holes parallel to the axis of the motor 20 are made through said cover 36, bearings 24 and 25 and the stator 29. Sleeves 38 are provided these through-holes 37 so as to receive and support workpieces and a tool etc.

In this embodiment, six through-holes 37 are made in a circumferential direction of the motor, however, their number, locations and configurations may be suitably selected.

Then, a multi-spindle automatic lathe with the afore-described motor 20 will be described hereinbelow with reference to FIG. 3.

Figure 3:
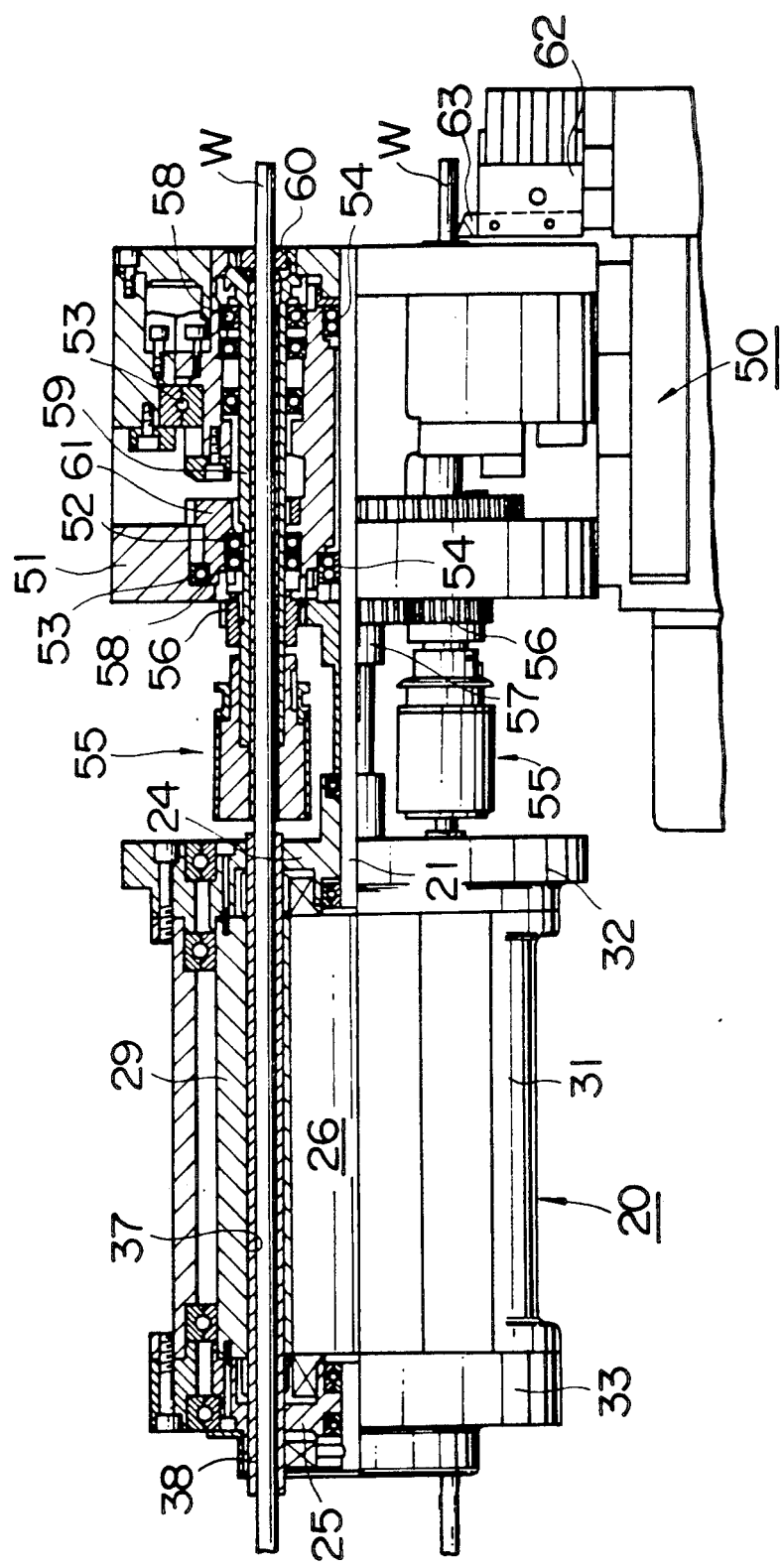
FIG. 3 is a longitudinal cross-sectional view of principal part of the multi-spindle automatic lathe with a motor according to the present invention.
Figure 4:
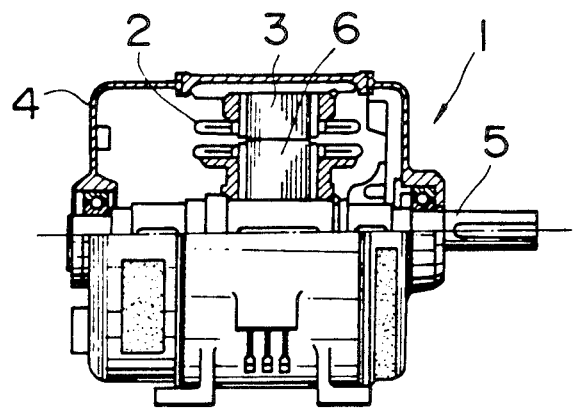
FIG. 4 is a longitudinal cross-sectional view of a motor of prior art.
Figure 5:
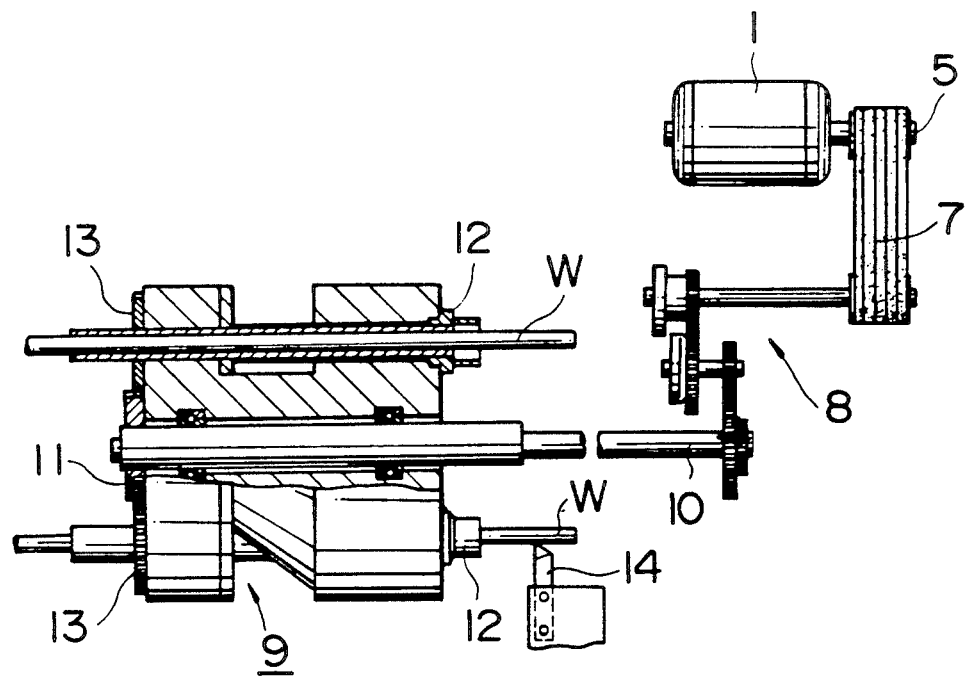
FIG. 5 is a general view of a multi-spindle automatic lathe of prior art.

FIG. 3 is a longitudinal cross-sectional view of the main parts of a multi-spindle automatic lathe, particularly illustrating a head portion of the multi-spindle automatic lathe 50 and the above-described motor 20 installed in it.

A spindle carrier 52 is freely and rotatably engaged with the headstock 51 of the multi spindle automatic lathe 50 by bearings 53. The outer cylinder 31 and frame bodies 32 and 33 of the motor 20 are secured to the multi-spindle automatic lathe 50 by means of securing means (not illustrated) so that the main axis 21 of the motor 20 may extend through the central portion of the spindle carrier 52. The main axis 21 is hold on the spindle carrier 52 via bearings 54. Drive gears 57 engaging with a driven gear 56 for the spindles (to be described later) are secured to the main axis 21 of the motor 20.

A plurality (six in this embodiment) of spindles 55 are freely and rotatably hold on the spindle carrier 52 via bearings 58 so as to face against through-holes 37 made in the motor 20, these spindles are parallel to the axial direction of the main axis 21. Therefore, each through-hole 37 made in the stator 29 of the motor 20 is located in line with a spindle 55 hold by the spindle carrier 52.

The spindle 55 comprises with a hollow spindle body 59 through which a piecework W is inserted, a chuck 60 which clamps a workpiece W, located on one end of the spindle body 59 and a driven gear 56 which engages with the drive gear 56, secured to the external portion of the body 59. As the main axis 21 of the motor 20 rotates, the drive gear 57 secured to the spindle 21 and the driven gear 56 engaging with the driving gear 57 rotate, which causes simultaneous revolution of the spindles 55.

The spindle carrier 52 is provided with an indexing gear 61 which serves to index the workpieces W clamped by the spindle 55, and this indexing gear 61 engages with the drive gear of an indexing mechanism (not illustrated). By means of the indexing mechanism, the spindle carrier 52, which is integrated with this indexing gear 61, rotates a certain angle to index the workpieces W on one of the spindles 55 successively to a predetermined position.

A tool rests 62 are provided in the multi-spindle automatic lathe 50, each tool rest 62 is provided with a bite 63 which is adapted to machine the workpiece W clamped by the spindle 55. The number of tool rests 62 corresponds with the number of workpieces W, so that each tool rest 62 has a different machining tool respectively.

The operation of a multi spindle automatic lathe 50 having a motor 20 of the present invention installed in it will be described hereinbelow.

Workpieces W are inserted into the spindle 55 and the through-hole 37, and then the chuck 60 is actuated to clamp workpieces W on the spindle 55, while through-holes 37 in the motor 20 are in line with spindles 55 of the spindle carrier 52. This may permit the workpiece W to be rotated in conjunction with the spindle 55 relative to the spindle carrier 52, while at the same time allowing the spindle carrier 52 to be integrated with the stator 29 of the motor 20 for rotation relative to the headstock 51 about the spindle 21. In this embodiment, six workpieces W are clamped by each of spindles 55.

In this manner, after workpieces W are inserted into the multi spindle automatic lathe, an indexing mechanism (not illustrated) is actuated to index each of spindles 55 for rotation so as to ensure a matched positional relationship between each of workpieces W and the bite. In this indexing operation, the stator 29 of the motor 20 is also caused to rotate via workpieces W in conjunction with the rotation of the spindle carrier 52.

Then, when the motor 20 is energized to rotate the spindle 21, the workpieces W are driven to rotate and it is thus possible for an operator to process workpieces W with the bite 63 provided on the tool rest 62 during rotation of workpieces W. The motor 20 is stopped after different processings have been applied to six workpieces W. This completes one processing cycle.

Then, after the spindle carrier 52 has been indexed for rotation through the angle of 60° by means of indexing mechanism again, the motor 20 is actuated to rotate each of spindles 55 to process workpieces W. This procedure is repeated successively to process workpieces W. By applying six different processings to each of workpieces W, a finished workpiece W is produced and thus the entire procedure is completed.

When the processing of the workpieces W has been completed, the finished workpieces W are cut-off and the chuck 60 of the spindle 55 is unclamped. Then, new workpieces W are moved in a right direction in FIG. 3 for feeing, and such workpieces W are clamped by the chuck 60 of the spindle 55 in a similar manner as above-described.

As described in details hereinbefore, if the motor 20 in which the through-hole 37 is defined in the axial direction of the stator 29 is installed on machine tools such as the multi spindle automatic lathe, it is possible for the motor 20 to be arranged in line with the headstock 51 of the multi spindle automatic lathe 50, and its main shaft 21 can be connected directly with the drive shaft, and therefore the need of belt or any intermediate transmitting member such as a drive transmitting means and the like is eliminated, resulting in a multi-spindle automatic lathe with a reduced manufacture cost and a compact design. This leads to a reduced space requirement for the installation of the lathe.

In the meantime, though the present invention has been described hereinbefore with reference to an embodiment wherein the motor 20 is secured in place on the multi-spindle automatic lathe, the applicability of the motor 20 of the invention is not limited to such an application, but also applicable to such a mechanism in which a traditional motor would otherwise interfere with an intended operation due to the presence of projecting rod-like member around an installation area of the motor. The motor may be thus applicable for installation on, for example, machine tools such as a multi-spindle drilling machine and the like. The motor is also applicable in the fields other than the art of the machine tools.

In accordance with the present invention, since the rotary shaft of the spindle carrier is arranged to be on a common axis with the rotary output shaft of the motor, and through-holes are defined on the common axis of plurality of spindles, it is possible for workpieces to be inserted into these through-holes and there is no spatial interference occuring between workpieces and the motor, whereby permitting the motor to be located close to the spindle carrier. This arrangement results in the multi spindle automatic lathe of straightforward and compact configuration.

We claim:

1. A multi spindle automatic lathe comprising a single motor for rotating a plurality of spindles which are freely rotatably supported on a spindle carrier which is in turn supported on a headstock for an indexing rotation, wherein said spindle carrier has its rotary shaft arranged so as to be a common axis with the output shaft of said motor, and wherein the lathe further comprises a means for transmitting the rotary output power of said motor to each of said plurality of spindles, and throught-holes defined in the stator portion of said motor so as to be a common axis with central holes of said plurality of spindles.

2. The multi spindle automatic lathe according to claim 1, wherein six of said through-holes are evenly spaced around the circumference of the stator portion of said motor.

* * * * *